Patented Aug. 17, 1948

2,447,427

UNITED STATES PATENT OFFICE 2,447,427

MEAT PRODUCT AND PROCESS

Edwin N. Oftedahl, Chicago, Ill.

No Drawing. Application June 14, 1945,
Serial No. 599,525

9 Claims. (Cl. 99—108)

This invention relates to a meat product and a process for producing the same. More specifically this invention relates to a fresh, ground, raw meat composition characterized by its ability to retain its fresh color and to resist bacterial and enzymatic decomposition on storage under refrigerating conditions, and to a process for preparing a meat composition having said characteristics. In addition this invention relates to a substance which may be incorporated with ground meat or hamburger steak in a manner to be hereinafter specified to provide a meat composition having the above indicated desirable characteristics.

In the art of merchandising fresh, ground raw meat there is always the problem of keeping the product under storage conditions in such a manner that it will not become decolorized and in such a manner that it will not deteriorate due to bacterial or enzymatic action. Ordinarily ground raw meat on display in a butcher shop will have a tendency to lose its appealing color after it has been exposed in showcases to the atmosphere for a substantial period of time. In the past, attempts have been made to prepare meat compositions of this character which will not have a tendency to lose their appealing color and to deteriorate under storage conditions. Prior attempts to solve this problem have not been entirely satisfactory. It has been proposed to incorporate substances such as sodium sulfite into such meat compositions in order to prevent the meat from decolorizing upon storage. However, sodium sulfite has not been entirely satisfactory and is undesirable for the reason that the use of sodium sulfite in meat compositions is prohibited in many localities.

Accordingly, it is an object of this invention to provide a preservative for fresh, ground raw meat or hamburger steak which preservative fulfills the requirements of the pure food and drug laws and which may be readily incorporated with the meat composition in order to obtain the desired results.

A further object of this invention is to provide a harmless ground meat or hamburger preservative which in itself increases the food value of the meat composition with which it is incorporated.

A further object of this invention is the provision of a fresh, ground, raw meat composition which is characterized by its ability to retain its fresh color and to resist bacterial and enzymatic decomposition on storage under refrigerating conditions.

An additional object of this invention is the provision of a ground meat or hamburger composition which has a smooth and even texture imparted thereto by the herein disclosed preservative.

A further and additional object of this invention is the provision of a process for improving the color and storage characteristics of a fresh, ground, raw meat composition which may be readily and effectively carried out.

Further and additional objects will appear from the following description and the appended claims.

In accordance with one embodiment of this invention, a fresh, ground, raw meat composition may be improved in respect to the several qualities indicated in the foregoing by incorporating therewith a relatively small quantity of egg albumin or egg white. The egg albumin, when properly incorporated into the ground meat composition in the manner to be hereinafter more particularly described, becomes associated with the meat particles in such a manner that the meat will not have a tendency to lose its natural or appealing color even after storage under the usual refrigerating conditions for a substantial period of time. The presence of the egg albumin in the chopped meat also renders the product resistant to bacterial and enzymatic decomposition. The explanation of this action of the egg albumin on the meat is not completely understood. However, it is thought possible that the albumin when thoroughly incorporated with the meat has a tendency to form a film on the meat particles which my have a tendency to exclude air therefrom, thereby preventing or substantially retarding the development of "off" color in the meat. Also it is known that egg albumin contain certain organic sulfur compounds which may be effective to inhibit or restrict bacterial or enzymatic activity in the meat composition.

It is, of course, well known in the culinary art that hamburger steak may be mixed with whole raw eggs immediately prior to the time that the hamburger is cooked. However, in the art of merchandising fresh meat it has not previously been recognized that egg white alone, when incorporated with the hamburger steak or other fresh, ground, raw meat compositions, will impart desirable keeping qualities to the meat. If whole raw eggs, or egg yolk and egg white in the proportion found in whole raw eggs, are incorporated into fresh, ground raw meat, an undesirable color is imparted thereto by the egg yolk, thereby destroying the eye-appeal which the product may have for the customer. Normally the ratio of egg yolk to egg white in a single egg is of the order of about four to one when calculated on the dry basis. In accordance with one embodiment of the present invention, a ground raw meat composition is prepared by incorporating therewith egg white or egg albumin in the presence or absence of an equal or lesser quantity of egg yolk. However, in no event should the ratio of egg yolk be increased to such an extent that an undesirable yellow color is imparted to the meat composition prepared in accordance with this invention.

In accordance with this present invention the egg white or egg albumin may be incorporated with the fresh, ground raw meat by any one of several different methods. It is preferred that a dry powdered egg white be employed for the process of this invention. This dry powdered product may, if desired, have an equal or less quantity of a dry powdered egg yolk composition mixed therewith. This dry mixture may be incorporated into the meat composition directly or it may first be solubilized in water and then admixed with the meat as desired.

In accordance with one embodiment of my invention, an aqueous solution may be prepared by thoroughly mixing one to one and one-fourth ounce of powdered egg white and one ounce of powdered egg yolk in one quart of water. The solution is whipped until the egg white and the egg yolk are dissolved in the water. The resulting solution is then incorporated by kneading into a quantity of fresh meat which has been previously passed through a medium or coarse grinder to provide a chopped or ground meat having a relatively coarse particle size. The quantity of meat to which this solution is added may vary from 10 to 25 pounds, depending upon the condition of the meat. The moisture and the fat content of the meat are largely determinative of the amount of meat that should be admixed with the above indicated solution. However, the operator can readily determine the exact quantity of solution to be added to a given quantity of meat in order to obtain the desired results.

The coarse ground meat to which the solution has been added is thoroughly mixed or kneaded until the mass becomes stiff due to the binding action of the protein. The stiffness at this stage indicates that the solution has been thoroughly admixed with the meat.

In the event that the ground meat is to be displayed for purposes of sale on the same day, the meat is then passed through a medium or fine grinder in order to produce a product having the desired particle size. The meat is then collected in the fluffed condition in a suitable tray or on a suitable surface and displayed as such. It has been found that a meat composition treated as indicated immediately above retains its color and keeping qualities for a substantial period of time.

In the event that the ground meat product is not to be sold on the same day that it is subjected to the initial coarse grinding process, then the egg white containing solution may be added thereto as specified above and the coarsely ground meat composition is thereafter packed into suitable containers under conditions to prevent the access of excessive quantities of free air thereto. This packed composition may be maintained in storage under refrigerating conditions for five days or more without showing substantial decolorization or deterioration due to bacterial or enzymatic activity. When the composition so packaged is to be displayed for sale it may then be passed through a medium or fine grinding plate and placed in a suitable display case in accordance with the usual practice. The appearance of ground meat or hamburger treated thusly has a very good color even though four to six days may have elapsed since the preservative of this invention was incorporated therewith.

For the purpose of showing the effectiveness of the process and product of this invention the following experiment was carried out. Somewhat discolored lean beef meat was first ground with a small amount of cod fat. This ground meat was then admixed with the egg solution and packaged as specified immediately above. This composition was allowed to stand in a refrigerator maintained at 33° to 42° F. for a period of five days. At the end of this period the meat was then reground and was found to be suitable for sale in every respect. It had a good color and showed no indication of gassiness, sourness, or "off" odor.

For best results in accordance with this invention the meat product with which the egg albumin has been incorporated should not be subjected to the final grinding operation until the day that the meat is to be displayed for sale.

In the foregoing the solution particularly specified has been one which comprises one to one and one-fourth ounces of dry, powdered egg white and one ounce of dry, powdered egg yolk dissolved in one quart of water. A solution having this composition has been found to produce several desirable results as indicated in the foregoing. However, if desired, the quantity of egg white in the solution may vary from ¾ to 1¼ ounces of egg white per quart of water. If this solution is added to 10 to 25 pounds of meat as specified in the foregoing, then the composition of the resulting product may range from about 0.18 to about 0.78 per cent of dry egg white on the basis of the total wet raw meat in the composition. While it has been found that the constituents of egg yolk are not at all essential for practicing this invention, egg yolk may be incorporated in relatively small amounts if desired. The amount of egg yolk is preferably less than the amount of egg white in the composition and it may vary so that the percentage of egg yolk constituents in the final meat product may vary from about 0.12 per cent to about 0.63 per cent of dry egg yolk on the basis of the total wet raw meat in the composition. An important function of the egg yolk in the process as specifically described above is to facilitate the dissolution of the egg white in the aqueous solution.

Of course in the broadest aspects of this invention as it pertains to egg albumin, the powdered egg white may be added to the meat in the form of a solution as specified above, or if desired, it may be added directly in the dry powdered form. If it is added in the dry form care should be taken thoroughly to incorporate the egg substance with the ground meat. This method is particularly useful when it is not desired to add any extraneous water to the raw meat and may be particularly desirable with meat which has been previously frozen. The amount of water which may be added to the meat with the egg composition does not appear to be particularly critical. However, in the event that an egg solution is used, the solution should be mixed and used fresh or kept under refrigerating conditions for a limited period in order that it will not spoil.

In the foregoing particular reference has been made to the production of a fresh, ground, raw meat composition which is prepared from lean beef and is commonly known as hamburger. However, this invention is not limited to hamburger compositions and other meat compositions may be prepared in accordance therewith. For example, an improved ground veal product may be prepared by admixing therewith a small amount of ground beef and then treating with the egg solution specified above. The consistency of the resulting product is much more pleasing than an ordinary ground veal product to which beef and egg white have not been added. Likewise in accordance with this invention ground lamb may be markedly improved in the manner specified in the foregoing.

In the foregoing, the egg albumin composition has preferably been admixed with a chopped meat of relatively coarse particle size that may have been produced by passing the meat through a medium or coarse grinding plate. However, under certain conditions it may be desirable to pass the meat through a fine grinding plate prior to mixing the egg white therewith. Also it has been pointed out that water may be used as the medium for dispersing the egg albumin prior to incorporation with the ground meat. If desired, however, cream or milk may be used for this purpose in place of water or other aqueous medium and a product having a higher food value may result by the use of such substances.

While particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A fresh, ground, raw meat composition characterized by its ability to retain its fresh color and to resist bacterial and enzymatic decomposition on storage under refrigerating conditions, said composition comprising ground raw meat which has admixed therewith a quantity of egg white and a lesser quantity on a dry basis of egg yolk.

2. A fresh, ground raw meat composition characterized by its ability to retain its fresh color and to resist bacterial and enzymatic decomposition on storage under refrigerating conditions, said composition comprising ground raw meat which has admixed therewith between about 0.18 and about 0.78% by weight of egg white (dry basis) and a somewhat lesser percentage by weight of egg yolk (dry basis).

3. A fresh, ground raw meat composition characterized by its ability to retain its fresh color and to resist bacterial and enzymatic decomposition on storage under refrigerating conditions, said composition comprising ground raw meat which has admixed therewith a preservative consisting of between about 0.18 and about 0.78% by weight of egg white (dry basis) and between about 0.12% and about 0.63% by weight of egg yolk (dry basis), the percentage of egg yolk being less than the percentage of egg white.

4. In the art of merchandising fresh, ground, raw meat capable of retaining its fresh color and of resisting bacterial and enzymatic decomposition, the process which comprises comminuting meat to a relatively coarse particle size, thoroughly incorporating therewith between about 0.18% and about 0.78% of egg white (dry basis) and less than an equal percentage of egg yolk (dry basis), further comminuting the resulting mixture to the desired particle size, and collecting the further comminuted mixture in a light fluffy condition suitable for display purposes.

5. In the art of merchandising fresh, ground raw meat capable of retaining its fresh color and of resisting bacterial and enzymatic decomposition, the steps of dispersing powdered egg white and less than an equal amount on a dry basis of powdered egg yolk in an aqueous solution and thoroughly incorporating the solution with a freshly comminuted meat, whereby the aforementioned desirable characteristics are imparted thereto.

6. In the art of preserving meat, the improvement which comprises thoroughly incorporating with freshly ground raw meat a preservative essentially comprising a small quantity of egg white and a lesser quantity on a dry basis of egg yolk constituents, whereby to produce a ground raw meat composition having essentiallly the same color as that of said raw meat prior to the incorporation of the preservative, and capable of retaining its fresh color and of resisting bacterial and enzymatic decomposition on storage under refrigerated conditions.

7. A ground raw meat preservative composition having powdered edible egg albumin as the primary preservative component and not more than an equal quantity (on a dry basis) of powdered egg yolk constituents, the latter being present in a proportion sufficient to facilitate the dispersion of said albumin when said preservative is mixed with an aqueous medium.

8. A fresh, ground raw meat composition characterized by its ability to retain its fresh color and to resist bacterial and enzymatic decomposition on storage under refrigerating conditions, said composition comprising a ground, fresh raw meat which has admixed therewith between about 0.18 and 0.78% by weight of egg white (dry basis).

9. The composition of claim 8 wherein egg yolk constituents are also admixed with the raw meat in an amount (dry basis) between about 0.12 and about 0.63% by weight but not greater than the amount of egg white.

EDWIN N. OFTEDAHL.

REFERENCES CITED

The following references are of record in the file of this patent:

UNITED STATES PATENTS

| Number | Name | Date |
| --- | --- | --- |
| 1,076,147 | Prevost | Oct. 21, 1913 |
| 1,388,699 | Crocker | Aug. 23, 1921 |
| 1,909,508 | Shick | May 16, 1933 |
| 2,171,428 | Griffith et al. | Aug. 29, 1939 |
| 2,379,441 | Kaehler | July 3, 1945 |

OTHER REFERENCES

"Food Inspection and Analysis," 1920, by A. E. Leach, page 267.

"Everybody's Cook Book," 1924, by I. E. Lord, pages 478, 482, and 492.